(12) United States Patent
Nelson et al.

(10) Patent No.: US 7,354,105 B2
(45) Date of Patent: Apr. 8, 2008

(54) SCHOOL BUS PASSENGER SEAT WITH INTEGRATED RESTRAINTS

(75) Inventors: Erik K. Nelson, Woodburn, IN (US); Patrick J. Mattes, Yoder, IN (US); Thomas R. Graham, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 427 days.

(21) Appl. No.: 10/785,815

(22) Filed: Feb. 24, 2004

(65) Prior Publication Data

US 2005/0184577 A1    Aug. 25, 2005

(51) Int. Cl.
*B60N 2/427*    (2006.01)
(52) U.S. Cl. .............................. 297/216.13; 297/216.1
(58) Field of Classification Search ............. 297/216.1, 297/216.13, 216.14, 483
See application file for complete search history.

(56) References Cited

U.S. PATENT DOCUMENTS

| | | | |
|---|---|---|---|
| 4,145,081 A | * | 3/1979 | Withers .................. 297/216.14 |
| 4,784,352 A | | 11/1988 | Smith et al. |
| 5,468,044 A | * | 11/1995 | Coman ................... 297/216.11 |
| 5,468,045 A | * | 11/1995 | Weber .................... 297/216.11 |
| 5,641,198 A | * | 6/1997 | Steffens, Jr. ........... 297/216.13 |
| 5,882,072 A | * | 3/1999 | Morlock ................. 297/216.13 |
| 6,123,388 A | | 9/2000 | Vits et al. |
| 6,485,098 B1 | | 11/2002 | Vits et al. |

* cited by examiner

*Primary Examiner*—Peter R. Brown
(74) *Attorney, Agent, or Firm*—Jeffrey P. Calfa; Gerald W. Askew; Susan L. Lukasik

(57) ABSTRACT

The invention provides a seat for a bus that has a movable front frame or seat back that a seat occupant rests his or her back against normally. The front frame is the mounting point for the upper portion of a three-point seat belt. The seat frame contains a rear passenger support wall or rear frame to protect a passenger of rearward seat from moving out his safety zone in a forward direction in the event of a rapid deceleration. The rear frame is part of the seat frame and only moves upon initial contact by a rearward-unbelted passenger impact. A rotation guide slot defines the amount of rear frame movement. The front frame is limited in the amount of its forward pivoting movement by a tether, spring or fluid dampener that is engaged to an immovable portion of the frame and thereby limits forward travel of the front frame.

7 Claims, 4 Drawing Sheets

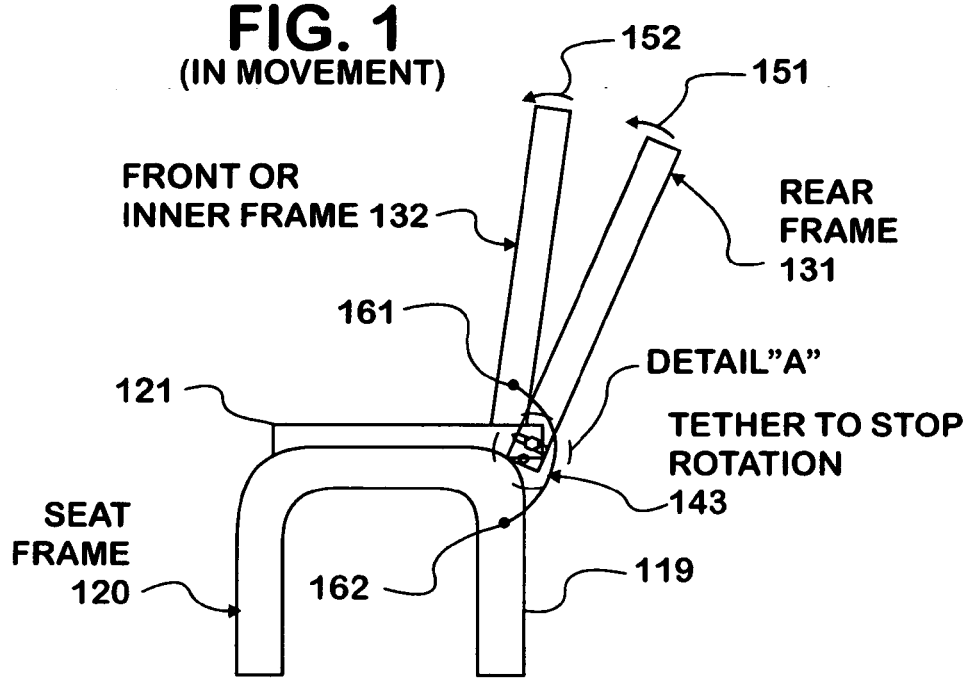
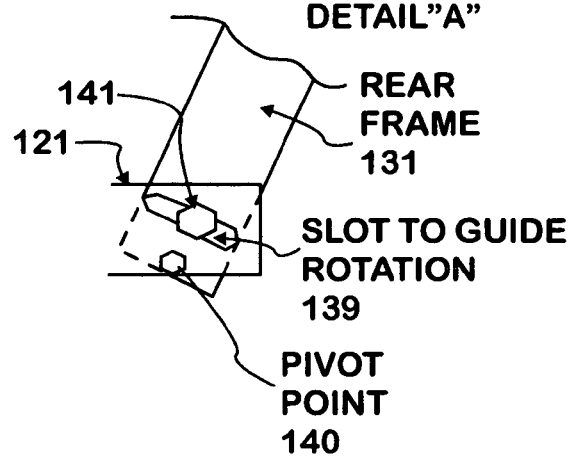
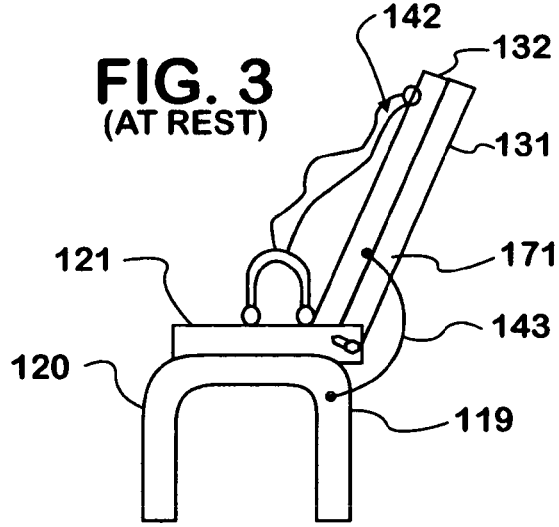

SCHOOL BUS PASSENGER SEAT WITH INTEGRATED RESTRAINTS

BACKGROUND

Automotive vehicles have had three point seat belt systems that combine a lap belt and an upper torso belt for some time now. The tongue may be swung across the person and engaged with a buckle affixed to the seat thereby positioning one portion of the belt across the lap and another portion of the belt across the upper torso.

Designers of school buses face a conundrum in including three point seat belts in buses in that the requirements involved with installing a three-point seat belt may act in conflict with the requirements for passive restraints. The U.S. federal government requirement for passive restraints requires that the rear side of the seat provide an impact barrier in which the seat back bends or deforms when subjected to the force of occupants impacting the rear side in a deceleration event. The National Highway Traffic Safety Administration, DOT (NHTSA), sets the federal requirements for these passive restraints. These are codified as 49 C.F.R. Section 571.222 (FMVSS 222).

The code specifies a passive restraint system, and does not require any sort of active restraints such as a two-point passenger restraining lap belt or a three-point passenger restraining lap belt and torso harness combination. The passive restraint requirement effectively provides a compartment in which an unbuckled passenger is constrained during a rapid deceleration of the bus. Although two point belt systems are offered on buses, designers need to consider three-point seat belts where there is a request for them through local, state, or transportation/parental action groups. Three point seat belt designs are also regulated under NHTSA code. These requirements relate to belts that are mounted in such a fashion that they inhibit a belted passengers forward movement. This three-point belt-mounting requirement is codified in 49 C.F.R. Sections 571.209 and 571.210 (FMVSS 209 and FMVSS 210).

The design conundrum results from the fact that tests have shown that in a rapid deceleration where the passenger in the front seat is buckled and the passenger in the rear seat is not, the initial action is that the buckled passenger moves forward applying tension on the buckled seat belt and the component the belt is affixed to. This results in a pulling of the fixture component in a forward direction thereby reducing the strength on the rear impact face for the unbuckled passenger behind the seat in question. Following the tension applied on the three-point belt, the rear passenger would be expected to contact the seat back. The reduction in seat back strength due to the pull on the three-point seat belt for FMVSS 210 requirement may reduce the ability of the seat back to meet the FMVSS 222 requirements. Recent school bus seat designs have been developed that involve a movable inner seat for the mounting of the three point seat belts and an immovable seat back portion for the absorption of the rear unbuckled passenger loads. The movable inner seat was inserted into a recess within the immovable seat back. The immovable seat back would be designed to deform in order to comply with FMVSS 222. One of these designs was disclosed in U.S. Pat. Nos. 6,123,388, and 6,485,098. The concept of a seat inserted within a seat was not new to this bus seat. That concept was disclosed in U.S. Pat. No. 4,784,352. The recently developed designs have weaknesses in their complexity of stop mechanism for the inner or movable seat portion as well as their reliance on seat back deformity to comply with the passive restraint requirement of FMVSS 222.

This invention entails making a bus seat that includes a front portion and a rear portion. Both parts are themselves movable beyond deformity required under FMVSS 222. Additionally, the front portion stop mechanism is less complex than the existing designs. The combined result is a unique solution to the conundrum of satisfying FMVSS 209, 210, and 222 for school bus seats; all these standards are incorporated by reference into this document.

SUMMARY

The invention provides a seat for a bus that has a movable front frame or seat back that a seat occupant rests his or her back against normally. The front frame is the mounting point for the upper portion of a three-point seat belt. The seat frame contains a rear passenger support barrier or rear frame to protect the rear-seated passenger from moving out of his/her safety zone in a forward direction in the event of a rapid deceleration. The rear frame is part of the seat frame and only moves upon initial contact by a rearward-unbelted passenger impact. A rotation guide slot defines the amount of initial rear frame movement. This is movement that would occur prior to deformation and greatly assists in the seats compliance with FMVSS 222. The front frame is limited in the amount of its forward pivoting movement by a tether or spring or fluid dampener that is engaged to an immovable portion of the frame and thereby limits forward travel of the front frame.

DRAWINGS

FIG. 1 is a side view of a seat shown dynamically and made in accordance with the invention.

FIG. 2 is a blown up portion showing Detail A of the seat of FIG. 1.

FIG. 3 is a side view of the seat of FIG. 1 in a static condition.

DESCRIPTION

Figure 4:
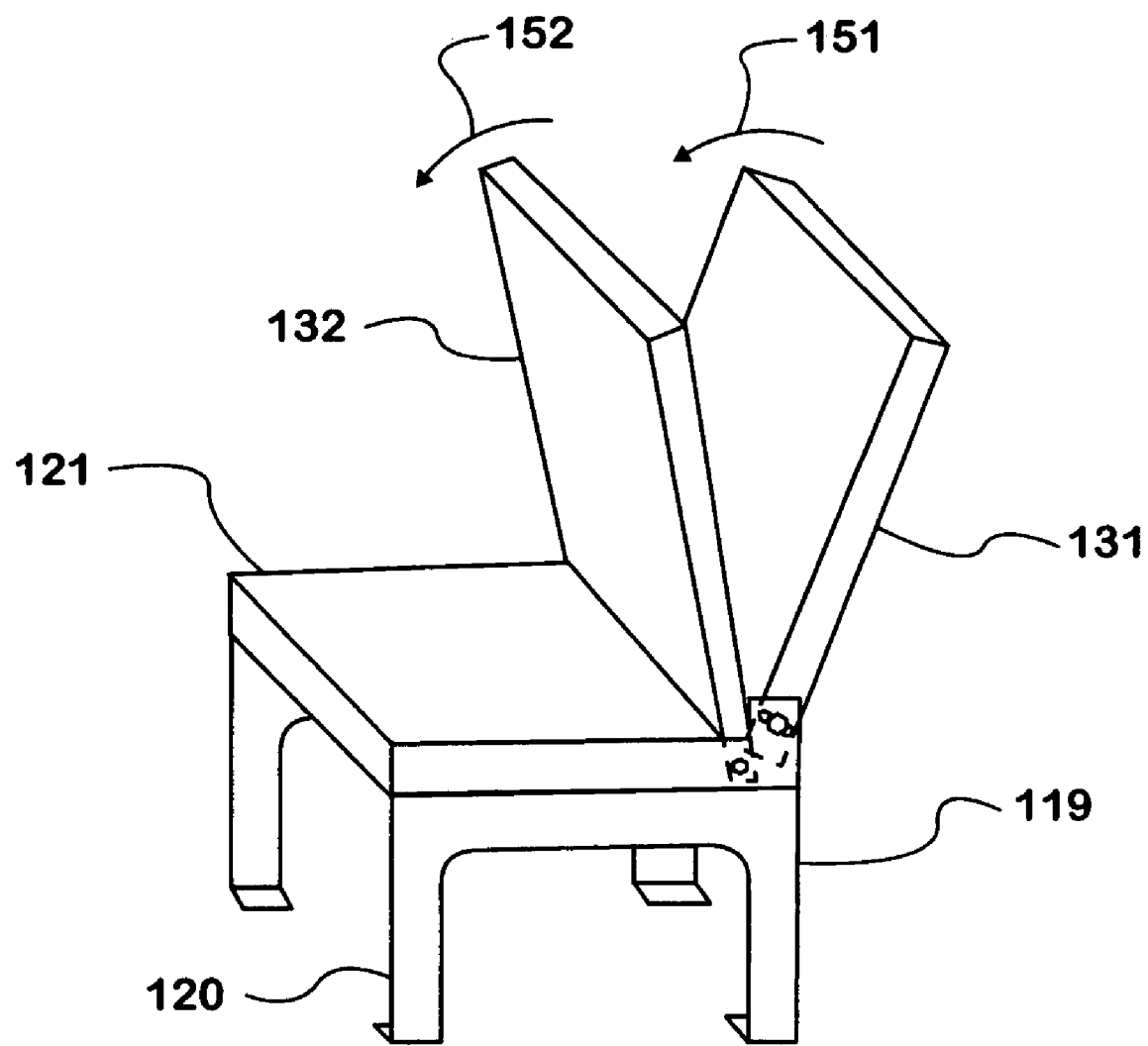
FIG. 4 is a perspective view of the seat of FIG. 1.
Figure 5:
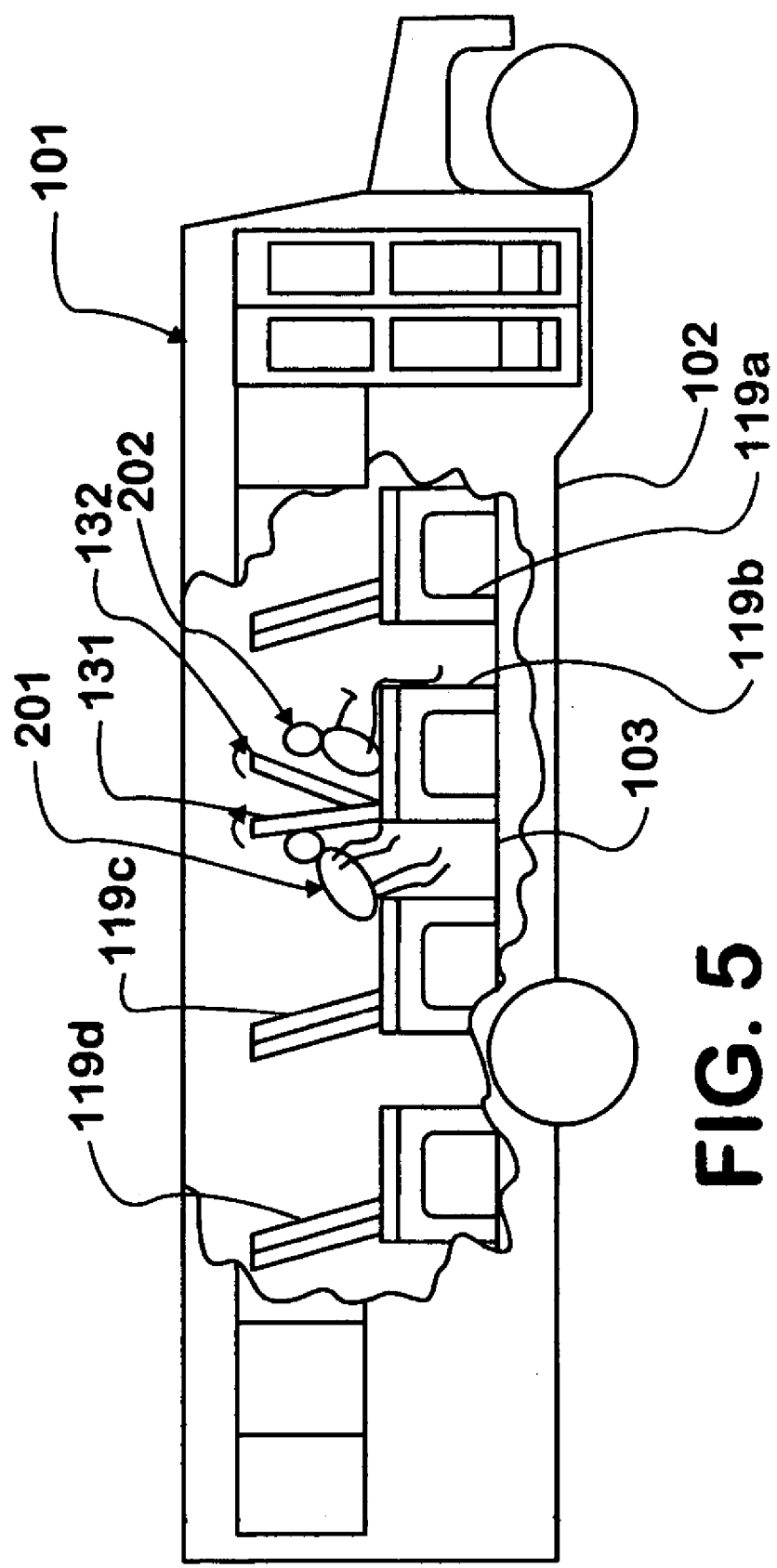
FIG. 5 is a side view of a mobile vehicle such as a school bus containing seats made in accordance with the invention and shown in a dynamic condition.
Figure 6:
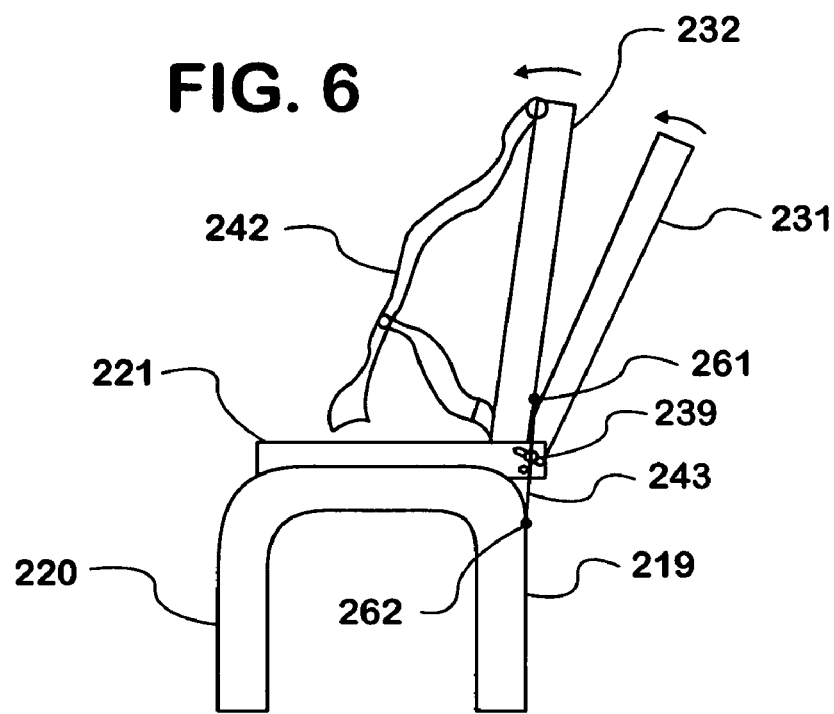
FIG. 6 is a side view of a second embodiment of a seat shown dynamically and made in accordance with this invention.
Figure 8:
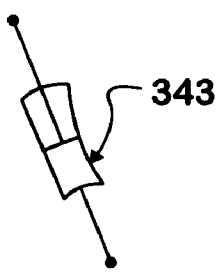
FIG. 8 is a view of a dampener component of the seat of FIG. 7.
Figure 7:
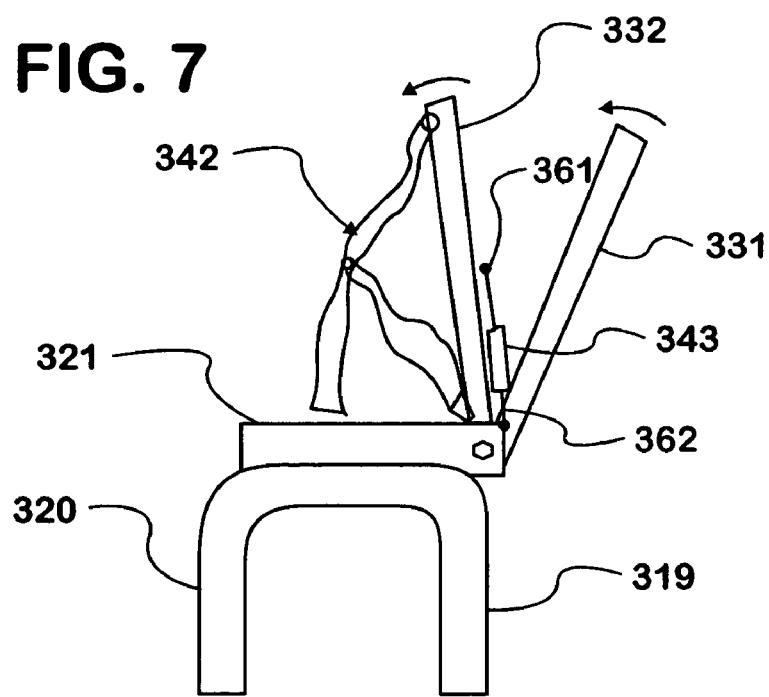
FIG. 7 is a side view of a second embodiment of a seat shown dynamically and made in accordance with this invention.

A mobile vehicle 101 such as a school bus is shown in FIG. 5. The bus 101 has a body 102 for carrying passengers. The bus body 102 has a floor mounting surface 103 for passenger seat mounting. A first embodiment of the passenger seat with integrated passenger restraints 119 is shown in FIGS. 1 to 4 with this embodiment shown installed as seats 119a, 119b, 119c, and 119d in FIG. 5. Additional embodiments as shown in FIGS. 6 to 8 may also be installed in the vehicle body 102 of FIG. 5.

The first embodiment passenger seat with integrated passenger restraints 119 has a movable front frame 132 that a seat occupant rests his or her back against normally. The front frame 132 is mounted to a seat frame 120. The front frame 132 is the mounting point for the upper portion of a three-point seat belt 142. The seat frame 120 is mountable to the bus body 102 mounting surface 103. The seat frame 120 contains a rear frame 131 to protect a passenger of rearward seat from moving out of his safety zone in a forward direction in the event of a rapid deceleration. FIG. 5 shows this rapid deceleration condition. The passenger 202 in seat 119b is buckled to the seat belt. The passenger 201 in the rearward seat 119c is not buckled. The passenger 201 is contained within the area between the rear frame of seat 119b and the front of seat 119c. The rear frame 131 is engaged to the seat frame 120 and only moves as shown by arrow 151 of FIG. 1 upon initial contact by a rearward-unbelted passenger impact.

The seat frame contains a horizontal seating component 121. The side of the horizontal seating component 121 has a rotation guide slot 139. The rotation guide slot 139 defines the amount of rear frame 131 pre-deformation movements. The rotation guide slot is shown as semi-circular cutout in the horizontal seating component although the guide slot could as well be in another portion of the seat frame. A pin or guide bolt 141 engaged to the rear frame 131 rides in the guide slot 139. This pre-deformation movement is that movement that would occur prior to rear frame 131 deforms from rear passenger impact and greatly assists in the seat's compliance with FMVSS 222. The rear frame 131 pivots about a pivot point 140. The guide slot could also be a different shape than semi-circular such as straight although this would have to be wider to maintain engagement with the pin or guide bolt 141.

The front frame 132 is limited in the amount of its forward pivoting movement by a leash limiter 143 such as a tether or spring. The leash limiter 143 is engaged between an immovable portion 162 of the frame 120 and the front frame 132 and thereby limits forward travel of the front frame 132. The arrow 152 shows the rotational movement of the front frame 132. The leash limiter 143 may run through a slot 171 in the rear frame 131 in order to avoid impressing torsion from the leash limiter 143 to the rear frame 131.

Applicants demonstrate an additional embodiment of a bus seat 219 made in accordance with the invention in FIG. 6. The second embodiment passenger seat with integrated passenger restraints 219 also has a seat frame 220 that is engaged to a movable front frame 232. The movable front frame 232 is where a seat occupant rests his or her back. The front frame 232 is the mounting point for the upper portion of a three-point seat belt 242. The seat frame 220 is mountable to the bus body 102 mounting surface 103. The seat frame 220 contains a rear frame 231 to protect a passenger of rearward seat from moving out of his safety zone in a forward direction in the event of a rapid deceleration. The seat frame contains a horizontal seating component 221. The side of the horizontal seating component 221 has a rotation guide slot 239. The rotation guide slot 239 defines the amount of rear frame 231 pre-deformation movements. A pin or guide bolt engaged to the rear frame 231 rides in the guide slot 239. This pre-deformation movement is that movement that would occur prior to rear frame 231 deforms from rear passenger impact and greatly assists in the seat's compliance with FMVSS 222. The rear frame 231 pivots about a pivot point. The front frame 232 is limited in the amount of its forward pivoting movement by a leash limiter 243 such as a tether or spring. The leash limiter 243 is engaged between an immovable portion 262 of the frame 220 and the front frame 232 and thereby limits forward travel of the front frame 232. The leash limiter 243 may run between a space between the rear frame 231 and the front frame 232 in order to avoid impressing torsion from the leash limiter 243 to the rear frame 231.

Applicants demonstrate a third embodiment of a bus seat 319 made in accordance with the invention in FIGS. 7 and 8. The third embodiment passenger seat with integrated passenger restraints 319 also has a seat frame engaged to a movable front frame 332. A seat occupant rests his or her back against the front frame 332. The front frame 332 is the mounting point for the upper portion of a three-point seat belt 342. The seat frame 320 is mountable to the bus body 102 mounting surface 103. The seat frame 320 contains a rear frame 331 to protect a passenger of rearward seat from moving out of his safety zone in a forward direction in the event of a rapid deceleration. The seat frame contains a horizontal seating component 321. The side of the horizontal seating component 321 has a rotation guide slot. The rotation guide slot defines the amount of rear frame 331 pre-deformation movements. A pin or guide bolt engaged to the rear frame 331 rides in the guide slot. This pre-deformation movement is that movement that would occur prior to rear frame 331 deforms from rear passenger impact and greatly assists in the seat's compliance with FMVSS 222. The rear frame 331 pivots about a pivot point. The front frame 332 is limited in the amount of its forward pivoting movement by a fluid dampener 343 where initial movement is inhibited to a preset expansion point and then further non-deformation movement is prevented. The dampener 343 is engaged between an immovable portion 362 of the frame 321 and the front frame 332 and thereby limits forward travel of the front frame 332.

As described above, the bus seats this invention and the vehicle with the seat installed provide a number of advantages, some of which have been described above and others of which are inherent in the invention. Also modifications may be proposed to the bus seats this invention and the vehicle with the seat installed without departing from the teachings herein.

We claim:

1. A passenger seat with integrated passenger restraints for installation in a motor vehicle, the motor vehicle having a body with a seat mounting surface, comprising:
   a seat frame that is mountable to vehicle body mounting surface;
   a movable backrest engaged to said seat frame, said backrest for a seat occupant to rest against;
   said backrest being a mounting point for an upper portion of a seat belt;
   said seat frame containing a movable rear frame;
   said seat frame contains a horizontal seating component;
   a side of said horizontal seating component having a rotation guide slot;
   said rotation guide slot defining a path for movement of said rear frame; and
   a pin engaged to said rear frame rides in said guide slot.

2. The passenger seat of claim 1, wherein:
   said backrest being limited in its forward pivoting movement by a leash limiter engaged between an immovable portion of said seat frame and said backrest.

3. The passenger seat of claim 2, wherein:
   said leash limiter being a tether.

4. A passenger seat with integrated passenger restraints for installation in a motor vehicle, the motor vehicle having a body with a seat mounting surface, comprising:
   a seat frame that is mountable to vehicle body mounting surface;

a movable backrest engaged to said seat frame, said backrest for a seat occupant to rest against;
said backrest being a mounting point for an upper portion of a seat belt;
said seat frame containing a movable rear frame;
said seat frame contains a horizontal seating component;
a side of said horizontal seating component having a semi-circular rotation guide slot;
said rotation guide slot defining a path for movement of said rear frame;
a pin engaged to said rear frame rides in said guide slot;
said backrest being limited in its forward pivoting movement by a leash limiter engaged between an immovable portion of said seat frame and said backrest; and
said leash limiter passing in a space between a lower portion of said rear frame and said backrest.

5. A passenger carrying bus, comprising:
a vehicle body with an interior seat mounting surface;
passenger seats with integrated passenger restraints engaged to said seat mounting surface;
each of said passenger seats having a seat frame;
a movable backrest engaged to said seat frame, said backrest for a seat occupant to rest against;
said backrest being a mounting point for an upper portion of a seat belt;
said seat frame containing a movable rear frame;
said seat frame contains a horizontal seating component;
a side of said horizontal seating component having a rotation guide slot;
said rotation guide slot defining a path for movement of said rear frame; and
a pin engaged to said rear frame rides in said guide slot.

6. The passenger carrying bus of claim 5, wherein:
said backrest being limited in its forward pivoting movement by a leash limiter engaged between an immovable portion of said seat frame and said backrest.

7. The passenger carrying bus of claim 6, wherein:
said leash limiter being a tether.

* * * * *